United States Patent Office 2,905,208
Patented Sept. 22, 1959

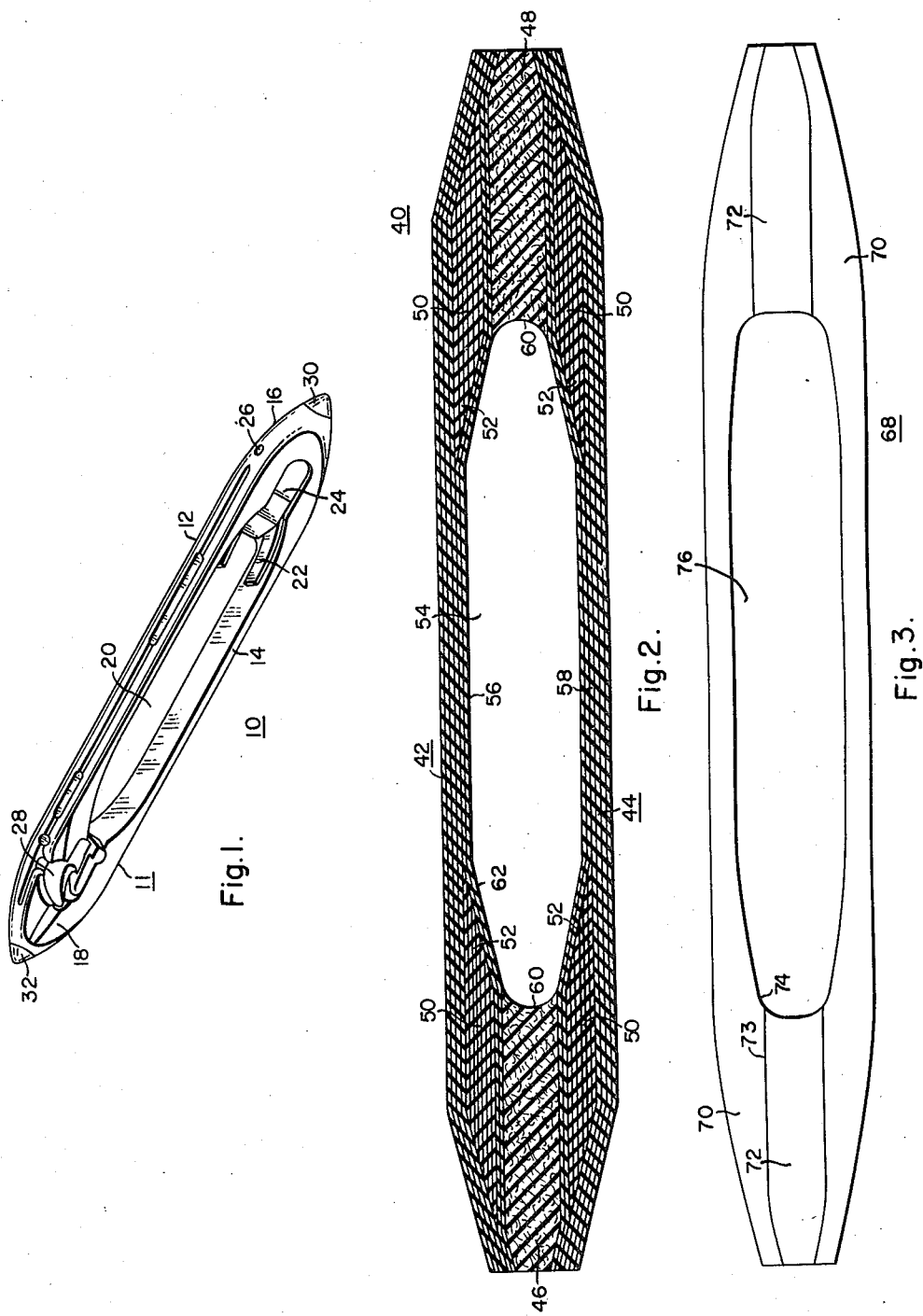

2,905,208

PLASTIC MOLDING FOR SHUTTLE

Theodore N. Goreau, Hampton, S.C., assignor to Westinghouse Electric Corporation, East Pittsburgh, Pa., a corporation of Pennsylvania Application March 7, 1957, Serial No. 644,563

4 Claims. (Cl. 139—196)

This invention relates to shuttles for weaving looms and particularly to shuttle bodies prepared from shuttle blanks molded from resinous materials in which reinforcing elements are incorporated.

It is well known in the art that a shuttle is subjected to considerable stresses and strains and impact during the operation of the weaving loom. A shuttle must be of rugged construction in order to remain in service a sufficient length of time to be economical. Shuttles prepared from wooden shuttle bodies usually last from five to six months in service.

Because of the short life of a wooden shuttle, it is desirable to construct a shuttle body of a material that will withstand, over a prolonged period of time, the conditions encountered in use. It has been proposed to mold shuttle bodies from plastic material. These previous plastic shuttle bodies have not proven entirely satisfactory; and premature failures often occurred. The shuttles frequently break at the corners where the sides of the shuttle join the heavier ends.

The object of this invention is to provide a molded laminated resinous shuttle body that will withstand, for prolonged periods of time, the stresses and strains to which a shuttle is subjected during the operation of a weaving loom.

Another object of the invention is to provide a shuttle blank from which a finished shuttle body can be prepared, said shuttle blank being molded from resin impregnated and bonded laminated sheet fibrous material and macerated resinous molding material, the laminated material and the macerated material being so arranged as to provide for high strength in the finished shuttle body.

Other objects of the invention will, in part, be obvious and will, in part, appear hereinafter.

For a better understanding of the nature and objects of the invention, reference should be had to the following detailed description and drawing, in which:

Figure 1 is a perspective view of a finished shuttle;

Fig. 2 is a cross-section through a molded shuttle blank; and

Fig. 3 is a plan view of a shuttle body to which this invention has been applied.

In Fig. 1 of the drawing there is shown a finished shuttle 10 comprising a shuttle body 11 and appropriate hardware. Said shuttle body comprises side members 12 and 14 and tapered end members 16 and 18, the interior surfaces of which define a bobbin chamber 20. The hardware comprises a spring clip 22 for holding a bobbin (not shown) in position seated in a suitable aperture in the end member 16 and held in place by a cover 24 and bolt 26; a threading block or eye 28 secured in end member 18; and spurs 30 and 32 secured to the end members 16 and 18.

During the operation of the weaving loom, the stresses and strains to which the shuttle body is subjected are concentrated in the regions at and near the corners of the bobbin chamber where the side members join the end members. With conventional wooden shuttles, as well as previous plastic shuttles, it is usually at one of these corners that failure or breakage occurs.

In preparing resinous shuttle bodies, a shuttle blank is molded close to the final form desired for the finished shuttle body. The shuttle blank is then machined, cut, sanded and otherwise treated to produce the shuttle body in the final form. Appropriate hardware is then secured to the shuttle body to form a finished shuttle.

In Fig. 2 of the drawing there is shown a molded shuttle blank 40 prepared in accordance with this invention. Separate preforms are first prepared of laminated wall members 42 and 44, and macerated end portions 46 and 48. The preforms carry B-stage phenolic resin and appropriate filler material. Preforms of this type are readily and easily prepared by methods well known in the art wherein just sufficient heat and pressure are applied to shape the material into a coherent body without advancing the cure to the C-stage. Two laminated wall member preforms are disposed with two macerated preforms between their ends in position in an appropriate mold and consolidated under heat and pressure to the unitary, infusible shuttle blank 40.

The laminated preforms are prepared from plies of sheet fibrous material impregnated with a B-stage phenolic resin, and the macerated preforms are prepared from chopped rags, flocculent material, short lengths of waste yarn fibers or the like impregnated with B-stage phenolic resins. A satisfactory resin ratio for the laminated preforms has been found to be from 1.8 to 2.0 and for the macerated preforms, from 2.0 to 2.5. Resin ratio is the weight of the untreated fabric plus the weight of the resin that is impregnated into the fabric to the weight of the untreated fabric.

Other thermosetting resins having the desirable properties of hardness, ruggedness and durability may be substituted for the phenolic resins and combined with a suitable fibrous filler. Examples of such resins are the melamine-aldehydes, phenol-aniline-aldehydes, polyepoxides, thermosetting alkyds and polyesters.

The sheet fibrous material employed in the laminated walls of the shuttle blank may be 6½ oz. cotton drill, 8 oz. cotton drill, 15 oz. duck, ramie or other fibrous materials, natural or synthetic.

It will be noted in Fig. 2 of the drawing that the side wall members 42 and 44 comprise a superimposed group of laminations extending the entire length of the shuttle blank, and a staggered stack 50 of laminations at each end. The stacks 50 provide tapered end surface portions 52, of an elongated chamber 54 that passes completely through the shuttle blank 40. It has been found that by incorporating these additional laminations comprising stack 50 at the corners of the elongated chamber, failures at these corners are substantially eliminated. As previously noted, the corners of the bobbin chamber of the finished shuttle have been the areas where most premature failures of finished shuttles occur.

The elongated chamber 54 is defined by the surfaces 56 and 58 of the interior surfaces of the side wall members 42 and 44. As shown in Fig. 2, one or two plies 62 of impregnated fabric may be disposed at the inside of the side members 42 and 44. The macerated material 46 and 48 is molded to form rounded end portions 60 of the elongated chamber 54.

One way of incorporating the staggered laminations in the shuttle blank is illustrated in Fig. 2. It will be apparent that the staggered laminations can be incorporated into the shuttle blank in various ways. It is important, however, that these additional staggered stacks of laminations be so positioned as to form a substantial portion of the corners in the bobbin chamber of the finished shuttle, and that the additional laminations be substantially parallel to the laminations forming the side members.

The shuttle blanks may be molded individually, or a long tube like member having the shuttle cross-section can be molded and cut to the width of shuttle blank desired, the width usually being from about 1 to 2 inches. The overall length of the shutle blank will usually be from about 12 inches to 20 inches, and the length of the centrally disposed elongated chamber 54 will be from about 6 inches to 10 inches. The thickness of the laminated wall members 42 and 44 will usually be from about ¼ inch to ½ inch, the thickness of the macerated end portions 46 and 48 being from about ¾ inch to 1 inch, and the thickness of each of the staggered stacks of laminations 50 being from about ½ inch to ⅞ inch. The molded shuttle blank is then machined, cut, sanded or otherwise treated to form a finished shuttle body.

In Fig. 3 of the drawing there is shown a machined shutle body 68 (without hardware). The line of juncture between laminated portions 70 and macerated poritons 72 of the body 68 is indicated by a plane 73 and shows that the corners 74 of the bobbin chamber 76 are formed for the most part by the far stronger laminated material 70. Since the materials 70 and 72 are effectively bonded into a consolidated unit there is no definite plane of cleavage.

The improved reinforced resinous shuttles herein disclosed are superior to conventional wooden shuttles. The shuttles of this invention have lasted in continuous service from fifteen to eighteen months in operation as compared to the usual five or six months for prior art shuttles. Also there is considerably less maintenance of these shuttles in service.

Since certain obvious changes may be made in the above invention and different embodiments of the invention may be made without departing from the scope thereof, it is intended that all mater contained in the above description and taken in connection with the accompanying drawing shall be interpreted as illustrative and not in a limiting sense.

I claim as my invention:

1. A molded shuttle blank comprising an elongated body having tapered ends and a centrally disposed elongated chamber having tapered end walls, said chamber passing completely through the shuttle blank from top to bottom, the shuttle blank comprising a plurality of resin impregnated and bonded plies of fibrous sheet material forming the side walls of the shuttle blank and extending the full length of the shuttle blank, the interior surface of the bonded plies of fibrous sheet material forming the surfaces of the elongated chamber, a stack of plies of resin impregnated and bonded fibrous sheet material disposed in staggered fashion at each of the four corners of the elongated chamber to form the tapered portions thereof, and a body of macerated fibrous resinous molding material disposed at the end of the shuttle blank between each group of two stacks of the staggered plies the entire assembly of plies and macerated molding material being consolidated into a unitary body under heat and pressure.

2. A molded shuttle blank comprising an elongated body having tapered ends and a centrally disposed elongated chamber having tapered end walls, said chamber passing completely through the shuttle blank from top to bottom, the shuttle blank comprising a plurality of resin impregnated and bonded plies of fibrous sheet material forming the side walls of the shuttle blank and extending the full length of the shuttle blank, said plies of fibrous sheet material extending substantially straight to a point part way in the end portion at which point the plies slope to the end of shuttle to form the tapered end portions thereof, the interior surface of the bonded plies of fibrous sheet material forming the surfaces of the elongated chamber, a stack of plies of resin impregnated and bonded fibrous sheet material disposed in staggered fashion at each of the four corners of the elongated chamber to form the tapered portions thereof, and a body of macerated fibrous resinous molding material disposed at the end of the shuttle blank between each group of two stacks of the staggered plies, the entire assembly of plies and macerated molding material being consolidated into a unitary body under heat and pressure.

3. A molded shuttle blank comprising an elongated body of a length of from about 12 to 20 inches, said elongated body having tapered ends and a centrally disposed elongated chamber having tapered end walls, said chamber passing completely through the shuttle blank from top to bottom and having a length of from about 6 to 10 inches, the shuttle blank comprising a plurality of resin impregnated and bonded plies of fibrous sheet material forming the side walls of the shuttle and extending the full length of the shuttle blank, said side walls having a thickness of from about ¼ inch to ½ inch, the interior surface of the bonded plies of fibrous sheet material forming the surfaces of the elongated chamber, a stack of a thickness of from ½ inch to ⅞ inch, the plies of resin impregnated fibrous sheet material disposed in staggered fashion at each of the four corners of the elongated chamber to form the tapered portions thereof, and a body of thickness of from about ¾ inch to 1 inch of macerated fibrous resinous molding material disposed at the end of the shuttle blank between each group of two stacks of the staggered plies, the entire assembly of plies and macerated molding material being consolidated into a unitary body under heat and pressure.

4. A shuttle for use in weaving comprising an elongated resinous body having side members, tapered end members and a centrally disposed elongated bobbin chamber passing through the elongated body, the shuttle comprising a plurality of resin impregnated and bonded plies of sheet fibrous material forming the side members of the shuttle and extending the full length of the shuttle, a stack of plies of resin impregnated and bonded sheet fibrous material disposed in staggered fashion at each corner of the elongated bobbin chamber, each of said stacks extending from each of the four corners of the bobbin chamber to the tapered ends of the shuttle, and a body of macerated fibrous resinous molding material disposed at the end of the shuttle between each group of two stacks of staggered plies, the entire assembly of plies and macerated molding material being consolidated into a unitary body under heat and pressure.

References Cited in the file of this patent

UNITED STATES PATENTS

| | | |
|---|---|---|
| 1,805,090 | Hill | May 12, 1931 |
| 2,771,100 | Consoletti | Nov. 20, 1956 |
| 2,781,791 | Neely | Feb. 19, 1957 |
| 2,824,581 | Heard | Feb. 25, 1958 |